Feb. 16, 1971  R. J. BISCOW ET AL  3,563,649
APPARATUS FOR MEASURING COPY PAPER CONSUMPTION
Filed July 11, 1968  3 Sheets-Sheet 1
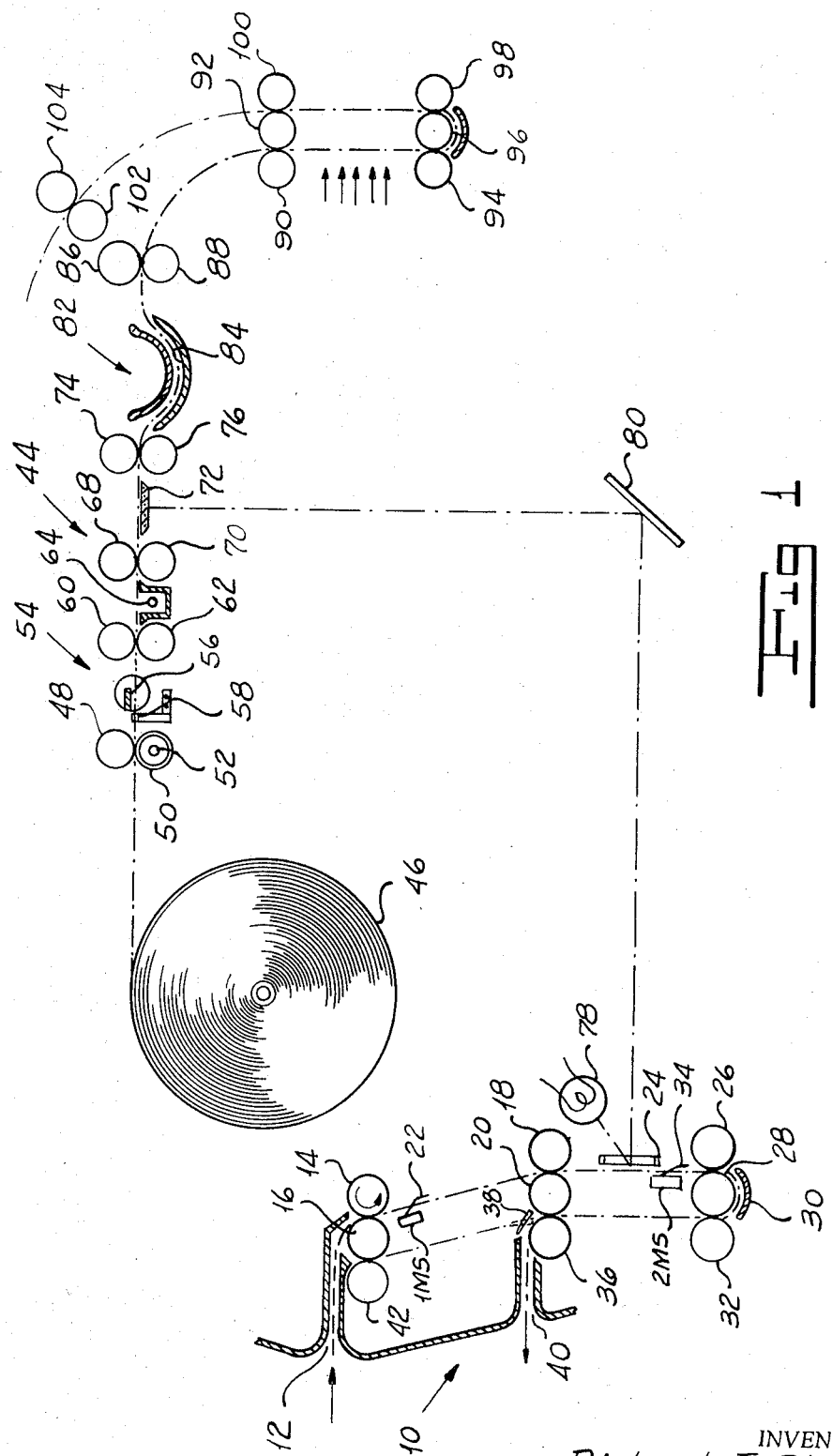
INVENTORS
Richard J. Biscow
Harold W. Timmerman
BY Shenier & O'Connor
ATTORNEYS

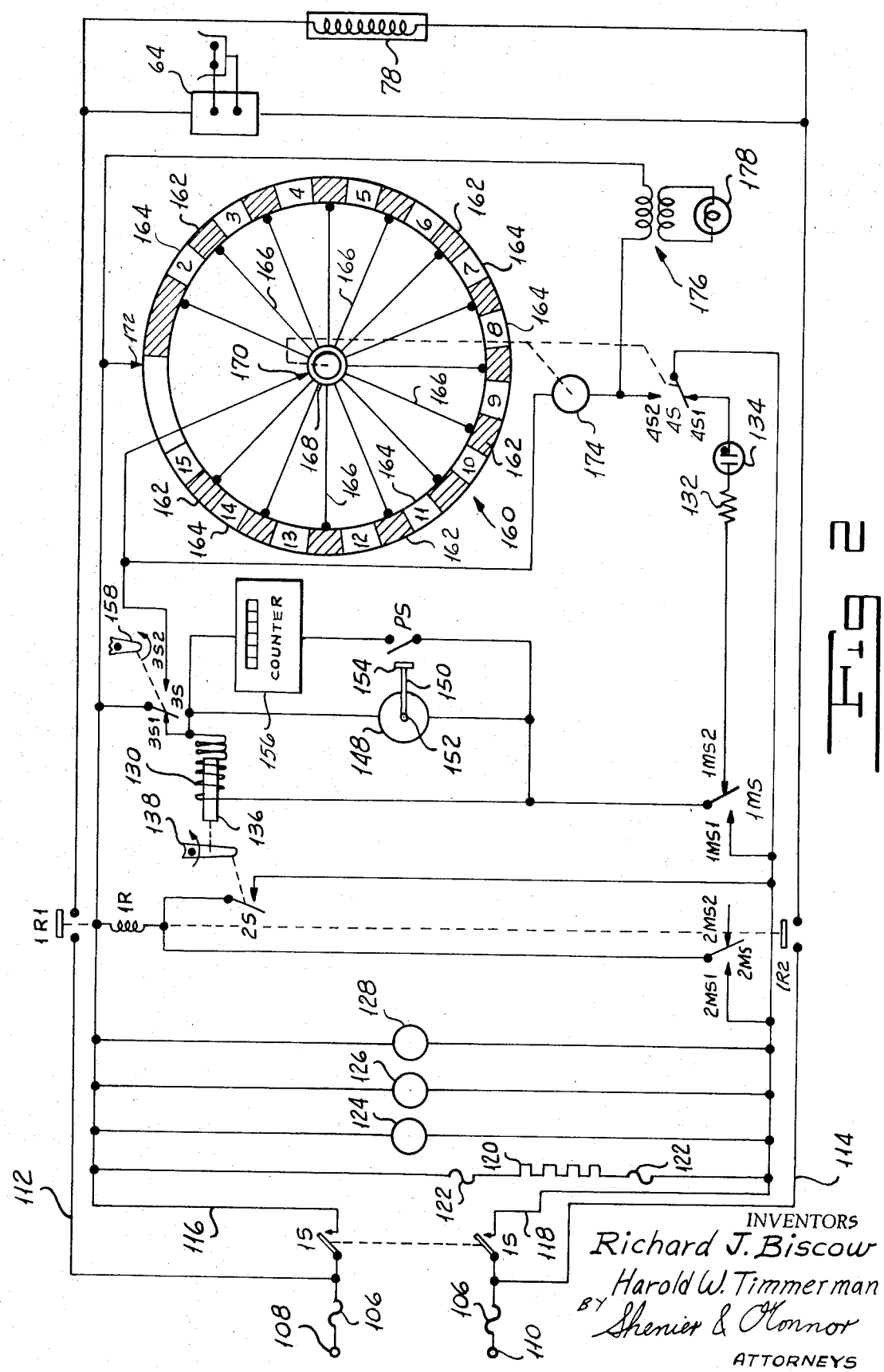

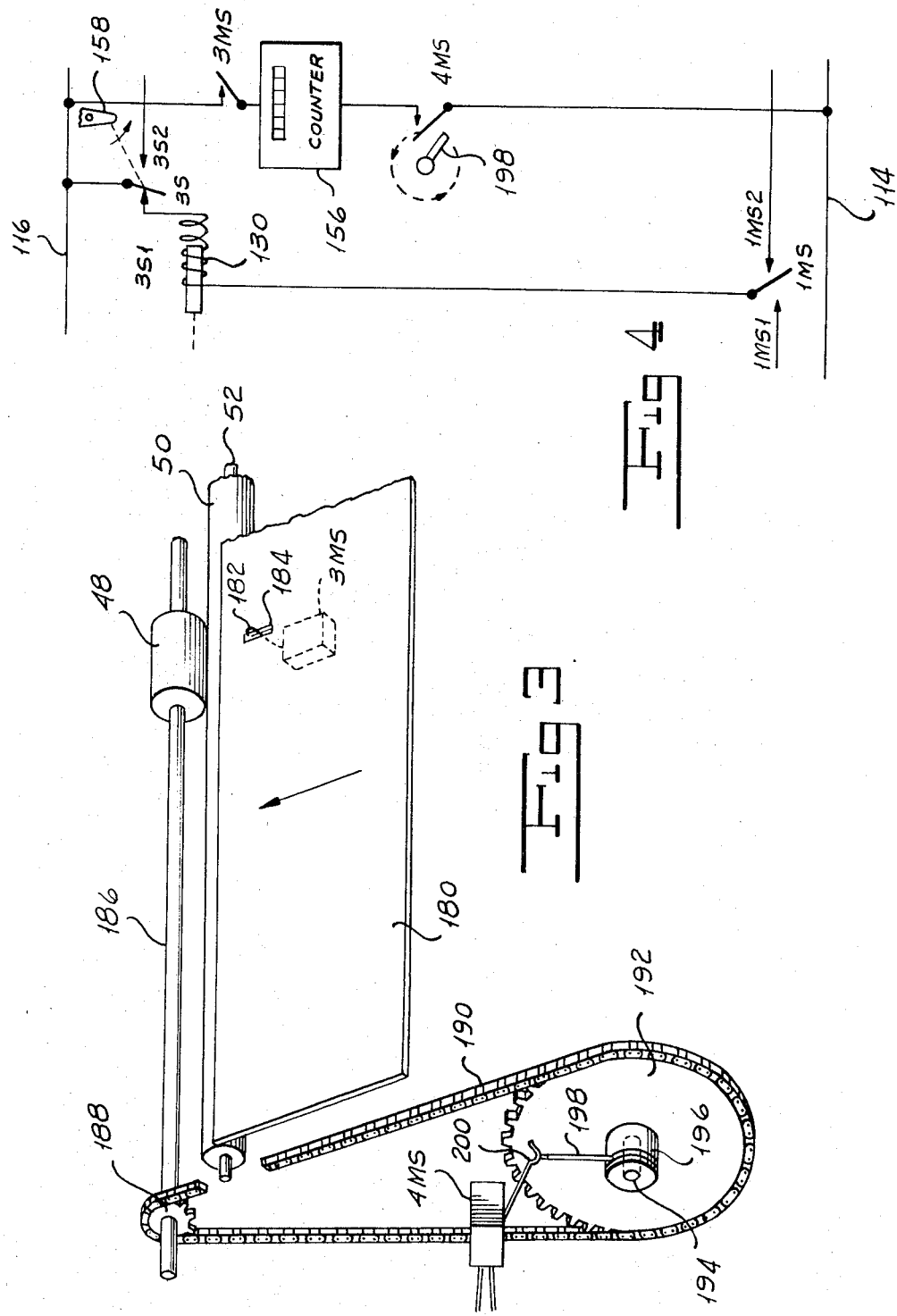

United States Patent Office 3,563,649
Patented Feb. 16, 1971

3,563,649
APPARATUS FOR MEASURING COPY PAPER CONSUMPTION
Richard J. Biscow, Mount Vernon, N.Y., and Harold W. Timmerman, Ridgewood, N.J., assignors to Savin Business Machines Corporation, New York, N.Y., a corporation of New York
Filed July 11, 1968, Ser. No. 744,019
Int. Cl. G03b 27/48
U.S. Cl. 355—50                          14 Claims

ABSTRACT OF THE DISCLOSURE

Apparatus for producing a direct measure of the amount of copy material consumed in a copy machine in which actuation of a copy paper feed clutch under the control of an original passing through the machine energizes a 60 r.p.m. motor which pulses a counter once each revolution of the motor to provide a total count, which is directly proportional to the aggregate time the clutch has been energized and thus is directly proportional to the amount of copy material used.

BACKGROUND OF THE INVENTION

Various types of copy machines are known in the prior art. Some of them have an internal supply of paper, which may be a stack of sheets. Many of these machines are so arranged as to make multiple copies of the same original. Various expedients also are known in the prior art for counting the number of times an operation such, for example, as making of a copy has been performed. Thus, in machines of the type wherein individual sheets of material are fed from a stack in the course of making a copy, no great problem exists in determining the number of copies which have been made and thus the amount of copy paper which has been consumed by the machine.

In a particular form of copy machine known in the prior art, the copy material is fed from a roll in response to passage of an original through the machine. This machine has the facility of making copies precisely to the length of originals within a wide range of lengths. It will readily be appreciated that the amount of paper consumed in a machine of this type cannot readily be determined merely by counting the number of copies which have been made. As a matter of fact, in such a machine a count corresponding to the number of copies which have been made by the machine is in no way an accurate measure of the amount of copy material which has been used.

The desirability of knowing the amount of paper which has been used in any copy machine will readily be appreciated. First, for accounting purposes as where the cost of paper is being charged to various accounts, the amount of paper used for each job must be known. Secondly, it is desirable, particularly in the case wherein the copy material is being fed from a relatively large roll, that the amount of paper consumed be known so that the remaining supply can be gauged and as the end of the roll is approached, a new supply can be made available.

We have invented apparatus for measuring the amount of copy material consumed in a copy machine. Our apparatus is especially adapted for use in a machine of the type which makes a copy corresponding to the length of an original within a relatively wide range of original lengths. Our apparatus affords a direct measure of the amount of paper which has been used and thus, a measure of the amount of paper remaining in a supply roll. Our apparatus is extremely simple and reliable for the result achieved thereby.

SUMMARY OF THE INVENTION

One object of our invention is to provide apparatus for measuring the amount of copy material consumed in a copy machine.

Another object of our invention is to provide apparatus for measuring copy paper usage which is especially adapted for application to a copy machine making a copy to the exact size of any original having a length within a wide range of lengths.

A further object of our invention is to provide apparatus for measuring copy material consumption in a machine of the type in which the copy material is drawn from a supply roll.

A still further object of our invention is to provide apparatus for measuring copy material consumption which affords a direct visual indication of the amount of material which has been consumed.

A still further object of our invention is to provide apparatus for measuring copy paper consumption which is simple in construction and which is reliable in use.

Other and further objects of our invention will appear from the following description.

In general our invention contemplates the provision of apparatus for measuring copy material consumption in which actuation of a copy material feed clutch in response to passage of an original through an original transport system operates means for pulsing a counter to provide a count, which is a direct measure of the time for which the clutch was actuated and thus of the amount of copy material fed by the clutch.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a schematic view of a copy machine which is provided with our apparatus for measuring copy material consumption.

FIG. 2 is a schematic view of an electrical circuit for controlling the operation of the machine shown in FIG. 1.

FIG. 3 is a fragmentary perspective view of an alternate embodiment of our apparatus for measuring copy material consumption.

FIG. 4 is a fragmentary schematic view of a portion of an electrical control circuit corresponding to the form of our apparatus illustrated in FIG. 3.

DESCRIPTION OF THE PREFERRED EMBODIMENT

Referring now to FIG. 1 of the drawings, one form of machine with which our apparatus can be used includes an original transport system, indicated generally by the reference character 10, adapted to receive an original to be copied through an inlet opening 12 leading to a first pair of feed rolls 14 and 16. These rolls 14 and 16 in cooperation with guides (not shown) advance the original toward a second set of feed rolls 18 and 20. In the course of movement from rolls 14 and 16 to rolls 18 and 20, the leading edge of an original first actuates the feeler 22 of a first two-position microswitch 1MS to initiate operations to be described hereinafter.

Feed rolls 18 and 20 advance the original past an exposure window 24 toward feed rolls 26 and 28 which direct the original toward a guide 30 which causes the original to move around roll 28 and up into the nip between roll 28 and another feed roll 32. As the leading edge of the original moves past window 24 and into the nip between rolls 26 and 28, it actuates the feeler 34 of a second microswitch 2MS. As will be explained in greater detail hereinafter, the leading edge of an original being fed through the transport system 10 engages the feeler 34 before the trailing edge of the original leaves feeler 22.

Rolls 30 and 32, together with guides (not shown), direct the original upwardly to another set of feed rolls, including roll 20 and a roll 36. A gate 38 disposed adjacent the original path immediately following rolls 20 and 36 is adapted to be moved between the full line position shown in FIG. 1 to direct the original toward an exit opening 40 when a single copy is to be made and to the broken line position in which it directs the original to guides (not shown) leading to the nip between roll 16 and another feed roll 42. The broken line position of gate 38 in FIG. 1 is the position occupied thereby when multiple copies are to be made. In that position of the gate, an original will move up between rolls 16 and 42, around the roll 16 and back downwardly between rolls 14 and 16 so as to recirculate through the system 10 in a manner to be described more fully hereinafter. As long as the machine is turned on, the rolls of the original transport system 10 are driven so as to carry an original around the transport system 10 in the manner described.

The copy material system, indicated generally by the reference character 44, of the machine with which our copy paper measuring apparatus may be used includes a supply roll 46 of any suitable copy material adapted to receive a latent electrostatic image in response to exposure to light in the pattern of the image. Material from the roll 46 extends through the nip between an idler roller 48 and a hollow roller 50 adapted to be driven in response to actuation of a clutch to be described hereinafter for coupling the roller 50 to a driving shaft 52. After leaving rollers 48 and 50, the copy material moves past a cutter station, indicated generally by the reference character 54, having a movable cutter blade 56 and a stationary cutter blade 58. The machine shown in FIG. 1 with which our copy material consumption measuring apparatus may be used is described in greater detail in the copending application of Charlap et al., Ser. No. 379,232, filed June 30, 1964, now Pat. No. 3,490,843 issued January 20, 1970. As is explained more fully therein, when a solenoid to be described hereinafter is energized, shaft 52 is clutched to roller 50 to cause copy material to be drawn off the supply roll 46. This material is fed past cutters 56 and 58 to feed rolls 60 and 62, which advance the material past a corona 64 to rolls 68 and 70, which carry the material past an exposure window 72 to feed rolls 74 and 76. As is explained more fully in the Charlap et al. patent referred to hereinabove, the movable cutter blade 56 normally is cocked. The solenoid is energized to clutch roller 50 to roller 52 and when the solenoid is de-energized in a manner to be described, paper is no longer drawn off supply roll 46 by the driving roller 50. At the same time the cocked cutter blade 56 is released to permit it to move past blade 58 to cut the trailing edge of the copy material. Further, as will be described hereinafter, operation of the solenoid to control the action of the clutch and of the cutter is under the control of an original passing through the system 10.

The machine is provided with a lamp 78 which is lighted in a manner to be described to illuminate the original through window 24. A mirror 80 reflects the image of the illuminated original to the copy material exposure window 72 to expose the copy material to place thereon a latent electrostatic image of the original. As the leading edge of the copy material is picked up by rolls 74 and 76, its trailing edge has been cut and the rolls 74 and 76 feed the copy material into the developer system, indicated generally by the reference character 82, including a trough 84 through which the copy material passes. As the copy material passes through the trough 84, it is subjected to the action of toner particles suspended in a liquid carrier. As is known in the art, the toner particles are electrostatically adhered to the latent image on the copy material.

After leaving the trough 84, the copy material is picked up by rolls 86 and 88 which, together with suitable guides (not shown), direct the sheet downwardly between rolls 90 and 92 past a fusing station at which the sheet is subjected to the action of hot air, then through rolls 94 and 96 and upwardly between rolls 96 and 98 to rolls 92 and 100 and finally, to rolls 102 and 104, which deliver the finished copy to the user of the machine.

Referring now to FIG. 2, we have shown our copy paper consumption measuring apparatus incorporated in one form of electrical circuit which may be employed to control the operation of the machine shown in FIG. 1. Respective fuses 106 connect the terminals 108 and 110 of a suitable source of power to power conductors 112 and 114. Ganged, normally open on-off switches 1S connect control conductors 116 and 118 to the source of power. The circuit includes a heater resistor 120 connected to conductors 116 and 118 by thermostatic fuses 122. A main drive motor 124, a blower motor 126 and a pump motor 128 all are connected across conductors 116 and 118. A pair of normally open switch contacts 1R1 and 1R2 are adapted to be closed upon energization of relay winding 1R to connect both the corona system 64 and the illuminating lamp 78 across the power conductors 112 and 114.

We connect the relay winding 1R between conductor 116 and the switch arm 2MS which normally engages an inactive contact 2MS2. A switch contact arm 3S leading from conductor 116 normally engages a contact 3S1. The clutch control solenoid 130 is connected between contact 3S1 and switch arm 1MS which normally engages a contact 1MS2. A current limiting resistor 132 and an "insert copy" lamp 134 are connected in series between contact 1MS2 and a contact 4S1 normally engaged by a switch arm 4S connected to conductor 118. With the resistor 132 and the lamp 134 in its circuit, insufficient current is drawn through the solenoid 130 to energize the solenoid.

As an original inserted in the machine passes through the original transport system 10, its leading edge actuates feeler 22 to move switch arm 1MS out of engagement with contact 1MS2 to extinguish lamp 134 and into engagement with a contact 1MS1 connected to conductor 118. In this condition of the switch, solenoid 130 is connected directly across the lines 116 and 118 so as to draw sufficient current to move its armature 136 to the right as viewed in FIG. 2. As is more fully pointed out in the copending Charlap et al. application referred to hereinabove, movement of solenoid armature 136 to the right pivots crank arm 138 in the direction of the arrow shown in FIG. 2 to permit a normally closed switch 2S to close. We connect the switch 2S between winding 1R and conductor 118 so that upon closing of the switch 2S, winding 1R is energized to close its switches 1R1 and 1R2 to energize the corona 64 and the illuminating lamp 78. At the same time movement of arm 138 causes the shaft 52 to be clutched to roller 50 to initiate movement of copy material in the machine.

We connect a 60 r.p.m. motor 148 in parallel with solenoid winding 130 so that when arms 1MS engages contact 1MS1 the motor 148 is energized along with the solenoid. An arm 150 carried by the shaft 152 of motor 148 for rotation therewith supports a magnet 154 for movement past a normally open proximity switch PS once for each revolution of the motor. Closing of switch PS as the magnet 154 moves past pulses a counter 156 to add one count for each revolution of the shaft 152.

Before the trailing edge of the original releases the feeler 22 to permit arm 1MS to return from contact 1MS1 to contact 1MS2, the leading edge of the original engages feeler 34 to operate switch 2MS to move its arm from the inactive contact 2MS2 to contact 2MS1 connected to conductor 118. Thus, there is provided a circuit for bypassing switch 2S.

When the trailing edge of the original leaves feeler 22 to permit arm 1MS to return to contact 1MS2, solenoid 130 and motor 148 both are de-energized. It will thus be seen that motor 148 is energized for the period of time during which copy material is being fed through the system. Since motor 148 is a 60 r.p.m. motor and the magnet 154 operates switch PS once during each motor revolution, counter 156 carries a number of counts which is equal to the number of seconds for which paper is fed. Knowing the diameter and the speed of rotation of the feed roller 50, the amount of paper which has been fed from the roll 46 can readily be gauged. By way of example, assuming that the roller 50 has a diameter of about 1½ inches and that its speed is about 12.8 r.p.m., approximately one inch of paper per second will be fed thereby. Therefore, under such conditions, the reading of the counter 156 is equal to the number of inches of paper which have been consumed.

While the solenoid 130 and the motor 148 are deenergized, when the trailing edge of the original leaves feeler 22, the engagement of arm 2MS with contact 2MS1 maintains the circuit of winding 1R so that switches 1R1 and 1R2 remain closed and both the corona 64 and the lamp 78 remain energized until the trailing edge of the original leaves the switch 2MS. The arrangement of the machine is such that at the time the trailing edge of the original passes the feeler 34, the trailing edge of the copy will have passed window 72. Thus, it is ensured that the lamp and corona remain energized a sufficient length of time to make a full image transfer from the original to the copy.

As is also more fully explained in the Charlap et al. application, when the solenoid is de-energized, movable cutter blade 56 is actuated to cut the trailing edge of the copy. When that occurs, an arm 158 of the cutter mechanism pivots in the direction of the arrow in FIG. 2 to move switch arm 3S from contact 3S1 to contact 3S2.

The machine is provided with an arrangement for making multiple copies. A multiple contact switch, indicated generally by the reference character 160, includes a plurality of conductive segments 162 separated by nonconductive, intersegmental spaces 164. Conductors 166 connect all of the segments to a slip ring 168 engaged by a brush 170 connected to contact 3S2. Another brush 172 is adapted to be moved relative to the contacts and spaces to an intersegmental space 164 corresponding to the number of copies to be made. When the brush and contacts are set relative to each other, switch 4S is moved to engage contact 4S2. With brush 172 in engagement with an intersegmental space 164 and with switch arm 4S in engagement with contact 4S2, at the time the cutter is operated in making the first copy, switch arm 3S engages contact 3S2 momentarily to energize the switch drive motor 174 to move the brush 172 and the contacts and spaces relative to each other to move the brush onto the next segment 162, which holds the motor circuit until the brush 172 arrives at the next intersegmental space. This operation continues until the switch arrives at its home position and arm 4S is returned to contact 4S1. It is to be noted also that the operation of setting the brush 172 to make multiple copies also sets the gate 38 to recirculate the original through the original transport system. A transformer, indicated generally by the reference character 176, is connected between conductor 116 and contact 4S2 to illuminate a lamp 178 which indicates to the operator the number of copies remaining to be made, as is explained more fully in the Charlap et al. application.

In operation of the machine provided with our means for indicating the amount of copy material which has been consumed in the machine, the operator first closes switches 1S to energize conductors 116 and 118 to turn on the various motors and the heaters. He next sets switch 160 to make the desired number of copies if more than a single copy is to be made. The original is inserted in opening 12 and is carried through the original transport system 10. Its leading edge first engages arms 22 of switch 1MS to move the contact arm 1MS from contact 1MS2 to contact 1MS1. This operation energizes solenoid 130 and the motor 148. Motor 148 moves magnet 154 past switch PS to add one count to the counter 156 for each second during which copy material is being fed.

Operation of the solenoid 130 also closes switch 2S to energize winding 1R to close switches 1R1 and 1R2 to energize corona 64 and lamp 78. Before the trailing edge of the original leaves feeler 22, the leading edge of the original engages feeler 34 to move switch arm 2MS from contact 2MS2 to contact 2MS1. Thus, there is provided a circuit for maintaining the corona 64 and the lamp 78 energized after the trailing edge of the original leaves feeler 22.

When the trailing edge of the original passes feeler 22, solenoid 130 is de-energized together with motor 148. At the same time the cutter operates. It will thus be seen that motor 148 is energized for the period of time during which copy material was drawn from the roll in making the first copy. As is also pointed out hereinabove, knowing the diameter of the feed roller 50 and its speed of rotation, the amount of paper which has been fed can be determined directly.

Where more than a single copy is being made, operation of the cutter causes arm 3S to engage contact 3S2 to drive switch 160 from one intersegmental space 164 to the next to indicate that one copy has been made. On the next passage of the original through the transport system 10 the machine operates as before and motor 148 is again energized for the period of time during which copy material is being drawn from the roll 46. It will be appreciated also that the machine is capable of making copies of various originals of different lengths since the feeding of copy material is entirely under the control of the original as it operates feeler 22. Since motor 148 is energized for all the time and only for the time during which copy material is being fed, it will always operate counter 156 to provide an accurate measure of the amount of copy material which has been used without regard to the differences in length of various originals or the number of copies which are being made.

Referring now to FIG. 3, we have shown an alternate embodiment of our arrangement for measuring the amount of copy material which has been consumed by the machine. In the arrangement shown therein copy material from the roll 46 extends in the direction of the arrow in FIG. 3 over a paper guide 180 to the nip between the idler roller 48 and the roller 50, which is adapted to be clutched to the shaft 52 in the manner described hereinabove, to draw material from the roll 46. In this form of our apparatus, we mount a microswitch 3MS on or adjacent the guide 180 so that a feeler 182 extends upwardly through a slot 184 in the guide. Switch 3MS is normally open and as long as material from the roll 46 extends to the nip between rolls 48 and 50, feeler 182 is actuated so as to close the switch 3MS.

The shaft 186 of idler roller 48 in this form of our apparatus carries a sprocket wheel 188 for rotation therewith. A pitch chain 190 in engagement with wheel 188 drives a second sprocket wheel 192 rotatably supported on a shaft 194 on the machine frame. A hub 196 on the wheel 192 carries a switch actuating arm 198 adapted to actuate the feeler 200 of a microswitch 4MS once for each revolution of the wheel 192.

As shown in FIG. 4, in this form of our invention switches 3MS and 4MS connect the counter 156 directly across conductors 114 and 116.

In operation of the form of our invention shown in FIGS. 3 and 4, as long as copy material extends from roll 46 to the nip between rolls 48 and 50, switch 3MS is closed so that counter 156 is in a condition to be pulsed upon closure of switch 4MS by the arm 198. Now, when the clutch is energized to cause shaft 52 to drive roll 50, idler roller 48 is driven. Owing to the connection provided by the pitch chain 190 between sprocket wheel 188 and wheel 192, as long as the clutch is energized wheel 192 will be driven. Once each revolution of that wheel, arm 198 actuates switch 4MS once to add one count to the counter.

In the system we described in connection with FIGS. 1 and 2, energization of the clutch resulted in concomitant energization of a 60 r.p.m. motor so that the number of counts on the counter was a direct measure of the number of seconds during which material was fed. Knowing the diameter of roll 50 and its speed of revolution, that count could be directly correlated with the length of material fed. In a particular example given in connection with FIGS. 1 and 2, the reading of the counter was in inches. With the same diameter and speed of rotation of idler roll 48 and with sprocket wheel 188 having the same diameter as roll 48, the counter 156 in the form of our invention shown in FIGS. 3 and 4 could be made to read directly in inches by providing a one-to-one ratio between sprocket wheels 188 and 192. Moreover, if we wished the counter to read in feet, we might provide a one-to-twelve ratio between wheels 188 and 192. Other possibilities would be to provide such ratios as would make the number of counts on the counter equal the number of 8½ inch lengths fed, corresponding to a standard letter size sheet, or make the count correspond to the number of 11 inch or standard legal size lengths which have been fed. In any event, the counter always provides an indication of the total copy material consumption of the machine. It is to be noted further that while we have specifically shown sprocket wheels 188 and 192 connected by a pitch chain 190, we could as well employ gear trains.

It will be seen that we have accomplished the objects of our invention. We have provided apparatus which affords an accurate measure of the amount of copy material which has been consumed in a copy machine. Our apparatus affords a direct indication of the amount of paper which has been used. It is especially adapted for use in a machine for making copies of originals of various lengths. It is simple in construction and reliable in operation.

It will be understood that certain features and subcombination are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A copying apparatus for making a copy of an original including in combination, an original transport system for carrying an original along a path past an original exposure window, a supply of copy material, a copy material exposure station, means for translating an image from said original exposure window to said copy material exposure window, a developing station, means including a clutch adapted to be actuated to draw material from said supply and for feeding a length of material successively past said copy material exposure window and past said developing station, means responsive to movement of an original through said original transport system for actuating said clutch and responsive to actuation of said clutch for providing a measure of the time during which said clutch is energized to feed said material.

2. Apparatus as in claim 1 including means for recirculating an original in said original transport system.

3. Apparatus as in claim 1 in which said clutch actuating means comprises a normally open switch having a feeler located in said path.

4. Apparatus as in claim 1 in which said time measuring means comprises a motor and means for counting the number of revolutions of said motor.

5. Apparatus as in claim 1 in which said clutch actuating means comprises a solenoid, said time measuring means comprising a motor connected in parallel with said solenoid, said motor having a shaft and means for counting the number of revolutions of said motor shaft, said clutch actuating means further comprising a normally open switch having a feeler located in said path, said switch adapted to be closed in response to actuation of said feeler by an original concomitantly to energize said feeler and said motor.

6. Apparatus as in claim 5 in which said counting means comprises a counter, a normally open switch adapted to be closed to pulse said counter and means carried by said motor shaft for closing said switch.

7. Apparatus as in claim 1 in which said time measuring means comprises a speed change mechanism.

8. Apparatus as in claim 1 including means for detecting the presence of copy material at said material drawing means and means responsive to said detecting means for enabling said time measuring means.

9. In a copy machine, means for advancing copy material through said machine, means including a clutch for activating said advancing machine, a source of energy, a counter, respective first and second normally open switches for connecting said counter to said source, means repsonsive to the presence of copy material at said advancing means for closing said first switch and means responsive to actuation of said clutch for periodically closing said second switch.

10. In a copy machine having a clutch adapted to be actuated to feed copy material through said machine, an assembly including a constant speed motor having a shaft, means responsive to actuation of said clutch for energizing said motor to drive said shaft and responsive to deactivation of said clutch for deenergizing said motor, and means for counting the number of revolutions of said shaft as a measure of the period of time during which said copy material is fed.

11. An assembly as in claim 10 in which said counting means comprises a counter, means including a normally open switch connected in a circuit with said counter for energizing said counter upon closure of said switch and means responsive to rotation of said shaft for closing said switch once in the course of each shaft revolution.

12. An assembly as in claim 11 in which said switch is a proximity switch and in which said means for closing said switch is a magnet carried by said shaft for movement therewith past said switch.

13. In a copy machine having a feed roll and a clutch adapted to be actuated to feed copy material through said machine, an assembly including a shaft, means including a change speed mechanism for connecting said feed roll to said shaft to drive said shaft in response to actuation of said clutch counting means, and means responsive to rotation of said shaft for actuating said counting means to count the number of revolutions thereof as a measure of the time during which said material is fed.

14. Apparatus as in claim 13 in which said counting means comprises a counter, means for detecting the presence of copy material adjacent said feed roll and means responsive to said detecting means for enabling said counting means.

References Cited

UNITED STATES PATENTS 3,456,187    7/1969    Schmidt _____ 324—70C–G

JOHN M. HORAN, Primary Examiner

D. J. CLEMENT, Assistant Examiner

U.S. Cl. X.R.

355—18